US009600233B2

(12) United States Patent
Klicnik et al.

(10) Patent No.: US 9,600,233 B2
(45) Date of Patent: Mar. 21, 2017

(54) GENERIC DATA MODEL FOR EVENT MONITORING INTEGRATION

(75) Inventors: Vladimir Klicnik, Oshawa (CA); Grace Hai Yan Lo, North York (CA); Curtis Reed Miles, Stouffville (CA); William Gerald O'Farrell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1791 days.

(21) Appl. No.: 12/327,988

(22) Filed: Dec. 4, 2008

(65) Prior Publication Data

US 2010/0146011 A1 Jun. 10, 2010

(51) Int. Cl.

*G06F 17/30* (2006.01)
*G06F 7/00* (2006.01)
*G06F 15/16* (2006.01)

(52) U.S. Cl.

CPC ................ *G06F 7/00* (2013.01); *G06F 15/16* (2013.01); *G06F 17/30* (2013.01)

(58) Field of Classification Search

CPC ............................ G06F 17/30; H04L 12/2602
See application file for complete search history.

(56) References Cited

U.S. PATENT DOCUMENTS

| | | | | |
|---|---|---|---|---|
| 7,949,606 | B1 * | 5/2011 | Sweet | 705/52 |
| 2002/0062237 | A1 | 5/2002 | Matsumoto et al. | |
| 2002/0069200 | A1 * | 6/2002 | Cooper et al. | 707/9 |
| 2002/0169658 | A1 * | 11/2002 | Adler | 705/10 |
| 2003/0018643 | A1 * | 1/2003 | Mi et al. | 707/10 |
| 2003/0105924 | A1 * | 6/2003 | Spencer et al. | 711/115 |
| 2004/0078543 | A1 * | 4/2004 | Koning et al. | 711/173 |
| 2006/0112175 | A1 * | 5/2006 | Sellers et al. | 709/223 |
| 2007/0094609 | A1 * | 4/2007 | Gilboa et al. | 715/762 |
| 2007/0174844 | A1 * | 7/2007 | Adams et al. | 719/318 |

OTHER PUBLICATIONS

Ahluwalia et al., "Model-Based Run-Time Monitoring of End-to-End Deadlines," EMSOFT'05, Sep. 19-22, 2005.*
Karsai et al., "Model-Integrated Development of Embedded Software," Proceedings of the IEEE, vol. 91, No. 1, Jan. 2003.*
Mathew et al., "Clips and Tacks: Getting Started with the IBM BPM Suite of Product," IBM WebSphere, Apr. 16, 2008, updated Apr. 24, 2008, pp. 1-120, <http://publib.boulder.ibm.com/bpcsamp/monitoring/clipsAndTacks/ClipsAndTacks.pdf>.

* cited by examiner

*Primary Examiner* — Mohammad S Rostami
(74) *Attorney, Agent, or Firm* — Yee & Associates, P.C.; Stephen Yoder

(57) ABSTRACT

Illustrative embodiments provide a computer-implemented method for a generic data model for event monitoring integration. The computer-implemented method generates monitor application descriptor data for an identified candidate, identifies a target monitor model specification associated with the identified candidate to form an identified target monitor model specification, and responsive to identifying the target monitor model specification, provides the monitor application descriptor data and the identified target monitor model specification, to a monitor model generator. The computer-implemented method further identifies application elements of the identified candidate to be monitored to form identified elements, and generates the identified monitor model for the identified elements to create a monitor-specific output.

17 Claims, 8 Drawing Sheets

700

```
                                              702
<application>
  <eventSource displayName="Expense Reimbursement Application" name="ERM">
   <eventSequenceIdPath name="ERP_SEQ_PATH"  704
     path="/event/@sequenceNumber"/>  706
   <correlationPropertySet name="ERP_CPS">  708
     <property name="Expense_ID" type="integer"/>
   </correlationPropertySet>
   <correlator name="ERP_Correlator">  710
     <correlationValuePath property="Expense_ID"
        path="/event/@expenseId"/>
   </correlator>
   <eventDescriptor name="ExpenseSubmitted">  712
     <identitySpecification name="ExpenseSubmitted_ID_Spec"  714
       path="/event/@type" value="ExpenseSubmitted"/>  716
     <eventPart name="ExpenseSubmittedDetails"  718
       path="/event/expenseDetails"/>  720
   </eventDescriptor>
   <eventDescriptor name="ExpenseApproved">  722
     <identitySpecification name="ExpenseSubmitted_ID_Spec"
       path="/event/@type" value="ExpenseApproved"/>
     <eventPart name="ExpenseApprovedDetails"
        path="/event/approvalDetails"/>
   </eventDescriptor>
   <eventDescriptor name="ExpensedReimbursed">  724
     <identitySpecification name="ExpenseReimbursed_ID_Spec"
       path="/event/@type" value="ExpenseReimbursed"/>
   </eventDescriptor>
  </eventSource>
</application>
```

```
<event type="ExpenseSubmitted" expenseId="ABC123" sequenceNumber="1">
  <expenseDetails>
    <expenseItem itemNumber="1" amount="45.99" dateIncurred="2008-09-25 17:15:02">
      <comment>Dinner expense for meal with customer Acme Inc.</comment>
    </expenseItem>
    <expenseItem itemNumber="2" amount="5.99" dateIncurred="2008-09-26 09:12:02">
      <comment>Bought a stapler for use in the office.</comment>
    </expenseItem>
  </expenseDetails>
</event>

<event type="ExpenseApproved" expenseId="ABC123" sequenceNumber="2">
  <approvalDetails>
    <approval approvedBy="Joan North" dateApproved="2008-09-27 09:05:05">
      <comment>This seems a little high, but I'll approve anyways.</comment>
    </approval>
  </approvalDetails>
</event>

<event type="ExpenseReimbursed" expenseId="ABC123" sequenceNumber="3"
reimbursedDate="2008-09-29 10:12:59"/>
```

802

804

806

800

GENERIC DATA MODEL FOR EVENT MONITORING INTEGRATION

BACKGROUND OF THE INVENTION

1. Field of the Invention

The present invention relates generally to an improved data processing system, and, more specifically, to a computer-implemented method, a data processing system and a computer program product for a generic model for event monitoring integration.

2. Description of the Related Art

Existing solutions require the knowledge of the implementation of individual monitored runtime applications. Monitoring requires a tool or manual process to gather information related to the application elements to be monitored. The gathering of such information may require the tool to collect, aggregate, correlate, filter and apply business rules and policies to performance metrics and other data from a wide variety of sources, including service-oriented architecture (SOA) and enterprise application integration (EAI) infrastructure systems, messaging middleware, web services, applications, and external sources such as really simple syndication (RSS) feeds, newsfeeds, and third-party supply chain systems.

The gathered information is then processed through the specific monitoring tool. When the specific monitor is changed to another monitor, the process has to be repeated according to the needs of the replacement monitor. When more than one monitor is used, and the monitors are different, data collection and formatting may again be required for each specific monitor format. Each monitor tool typically requires a description of the source material to monitor in a specific form of information as input. For example, when two different monitors are used for monitoring different aspects of an application, each monitor typically requires the application specifications in a unique format specific to each monitor.

For example, applications in an integration process, known as business integration modules, have a number of components with differing implementations, such as business process execution language processes based on the specification from the standards body of OASIS Web Services Business Process Execution Language (WSBPEL) Technical Committee, business state machines, human tasks, and others. Each component has an associated model with a different set of monitoring characteristics. Each component emits a different set of events of different structures and semantics. The user of the development tool is responsible for indicating which events the application should actually emit as the application allows users to enable the set of events that can be emitted by each component.

Currently, the onus is on the individual monitoring system to interrogate the monitoring characteristics of the application and each of the application components to generate the appropriate monitoring instructions, according to the programming model of the monitoring system. The requirement leads to tight coupling between the monitoring system and the runtime engines that execute the applications to be monitored. The tight coupling occurs because the monitoring system must be intimately aware of the models used to represent the application components, as well as all the nuances of how the application can and will emit event information during execution.

BRIEF SUMMARY OF THE INVENTION

According to one embodiment of the present invention, a computer-implemented method for a generic data model for event monitoring integration is provided. The computer-implemented method generates monitor application descriptor data for an identified candidate, identifies a monitor model associated with the identified candidate to form an identified target monitor model specification and, responsive to identifying the target monitor model specification, provides the monitor application descriptor data and the target monitor model specification to a monitor model generator. The computer-implemented method further identifies application elements of the identified candidate to be monitored to form identified elements, and generates the identified monitor model for the identified elements to create a monitor-specific output.

In another embodiment, a data processing system for a generic data model for event monitoring integration is presented. The data processing system comprises a bus, a memory connected to the bus, wherein the memory comprising computer-executable instructions, a communications unit connected to the bus, and a processor unit connected to the bus. The processor unit executes the computer-executable instructions to direct the data processing system to generate monitor application descriptor data for an identified candidate, identify a monitor model associated with the identified candidate to form an identified target monitor model specification, and responsive to identifying the target monitor model specification, provide the monitor application descriptor data and the target monitor model specification to a monitor model generator. The data processing system further identifies application elements of the identified candidate to be monitored to form identified elements, and generates the identified monitor model for the identified elements to create a monitor-specific output.

In yet another embodiment, a computer program product for a generic data model for event monitoring integration is presented. The computer program product comprises a computer-readable medium containing computer-executable instructions stored therein. The computer-executable instructions comprise computer-executable instructions for generating monitor application descriptor data for an identified candidate, computer-executable instructions for identifying a monitor model associated with the identified candidate to form an identified target monitor model specification, and computer-executable instructions responsive to identifying the target monitor model specification, for providing the monitor application descriptor data and the target monitor model specification to a monitor model generator. The computer program product further comprises computer-executable instructions for identifying application elements of the identified candidate to be monitored to form identified elements, and computer-executable instructions for generating the identified monitor model for the identified elements to create a monitor-specific output.

BRIEF DESCRIPTION OF THE SEVERAL VIEWS OF THE DRAWINGS

FIG. 7 is a text representation of a code snippet of a generic data model from an application to be monitored, in accordance with illustrative embodiments;

FIG. 8 is a text representation of a code snippet for event information emitted from a monitored application, in accordance with illustrative embodiments;

DETAILED DESCRIPTION OF THE INVENTION

Figure 1:
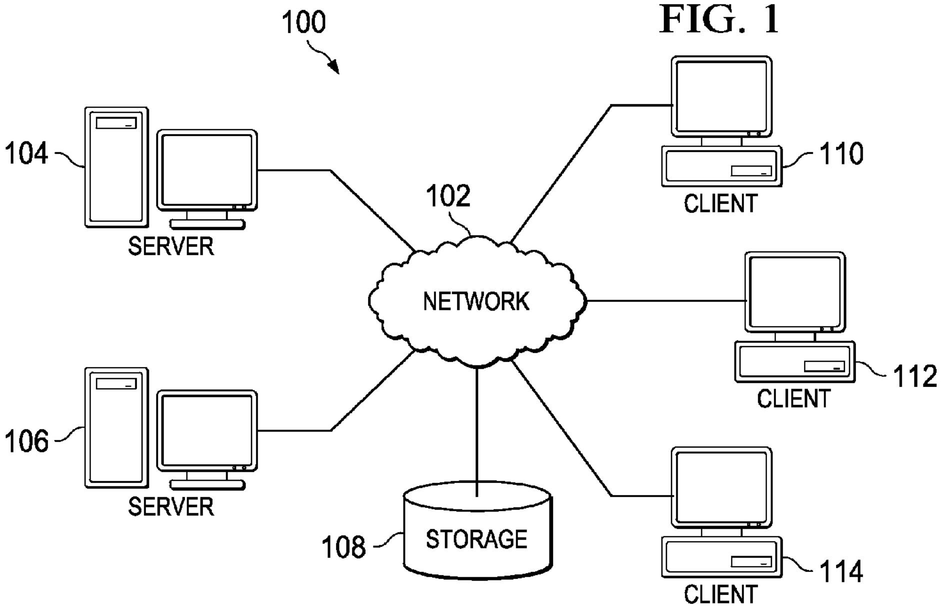
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 2:
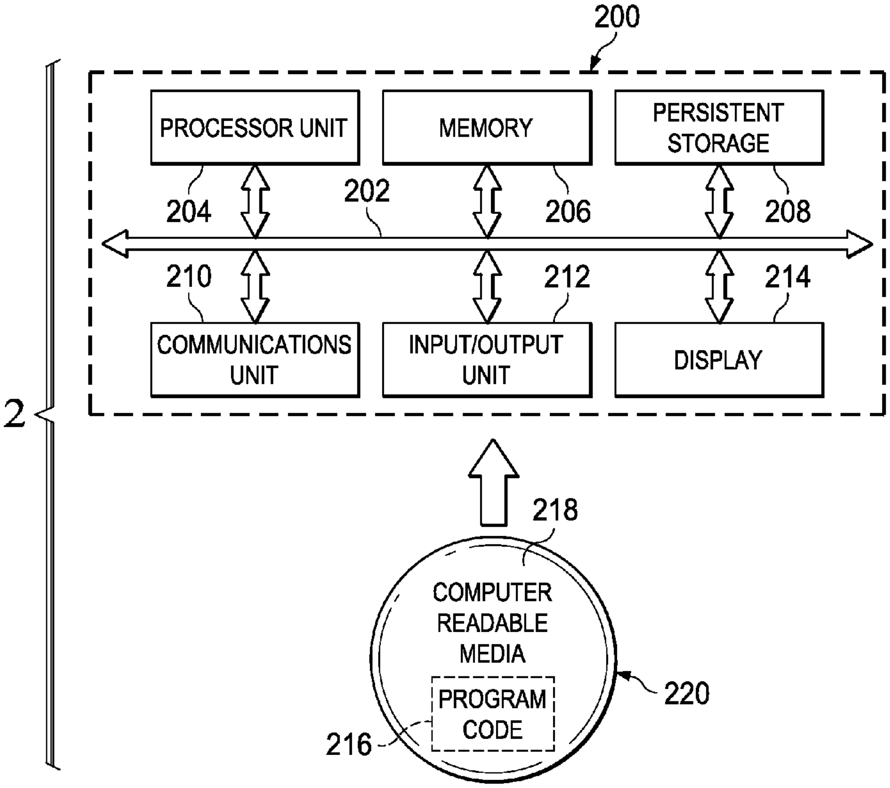
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer-recordable storage medium and downloaded to a data processing system or other device for use. For example, program code may be stored on a computer-recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to the system of FIG. 1, a user on client 110 may want to monitor an application on server 104 through network 102. A second user on client 112 may want to monitor the same application on server 104 with a different monitor for the same or different purpose. The application source is obtained and analyzed to produce a set of event sources and event descriptors. From the analysis is provided a monitor-neutral description of the application structure. The monitor-neutral form is a set of monitor application descriptors from which monitor-specific output is generated. In the example, a monitor-specific output is created for each user from the single set of monitor application descriptors. The monitor-specific output is then executed to monitor the runtime of the application of interest by each user.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit

210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
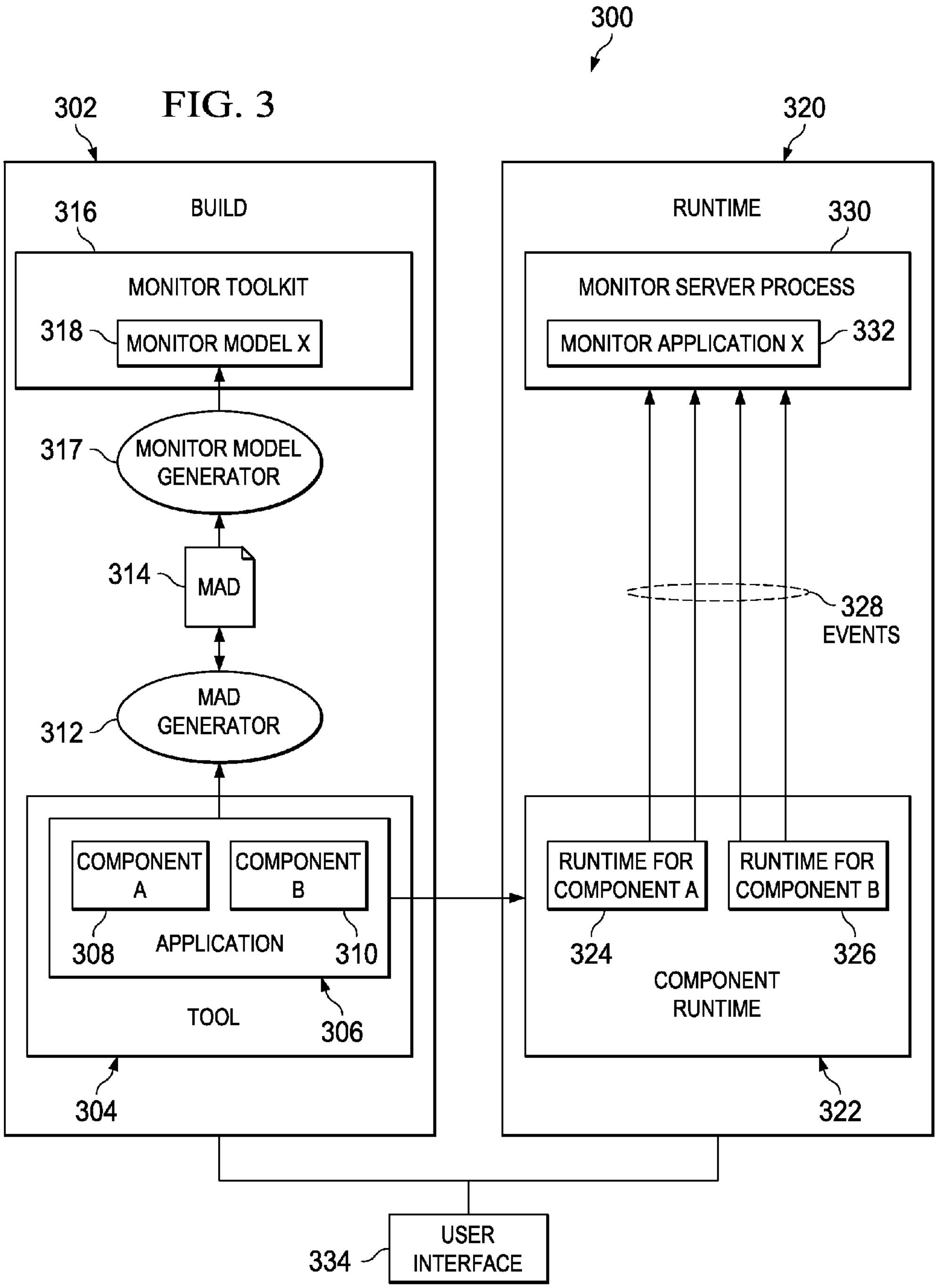
FIG. 3 is a block diagram of a system using a generic model for event monitoring integration, in accordance with illustrative embodiments.

With reference to FIG. 3, a block diagram of a system using a generic model for event monitoring integration, in accordance with illustrative embodiments, is shown. System 300 depicts the relationship between the two basic monitor environments. Build 302 is an environment in which the information needed for monitoring of the executing application is gathered and prepared. Runtime 320 is the execution environment where the actual monitoring of the executing application occurs.

Tool 304 defines the business application components, also known as business integration modules, and the event enablement for application 306. Component A 308 and component B 310 are components of application 306 that will be described for monitoring. The description process is performed by monitor application descriptor (MAD) generator 312. Monitor application descriptor generator 312 receives source statements of application 306 for processing into a generic data model set of statements describing the application components and events for which monitoring is desired. The business application components or business integration modules may be composed of various program styles and content, but can function together in an integrated solution, such as a Web service offering.

Monitor model generator 317 produces a monitor-specific output from monitor application descriptors 314 and a selected target monitor specification. Monitor application descriptors 314 is a set of intermediate source statements derived from application 306. The purpose of monitor application descriptors 314 is to provide an implementation-independent representation of the monitoring and event emission characteristics of one or more runtime applications. The generic representation of monitor application descriptors 314 can then be used as the input to a process of monitor model generator 317, capable of generating specific instructions for monitoring the application within a particular monitoring system. The generic representation is thus monitor-neutral and requires further processing to be used by a specific monitor. Existing solutions require the knowledge of the implementation of individual monitored runtime applications.

Monitor application descriptors 314 is specifically designed to only contain monitoring information that is known by and relevant to the application itself. The information may be categorized as related to the structural representation of the application, the ability of each of the structural elements to emit events throughout the element lifecycle, the expected sequence of the events, and the information that each event contains.

Monitor application descriptors 314 does not dictate how the application is monitored, but rather what aspects of the application are available to be monitored. This distinction allows monitor application descriptors 314 representation of application 306 to be independent of any particular monitoring technology and/or requirements. Thus, single monitor application descriptors 314 can be generated for a particular application 306 as a source input for multiple monitor tools instead of individually generating information for each monitoring programming model to be supported.

Monitor application descriptors 314 representation can be used as input for generating monitoring instructions for application 306 and as a basis for comparing versions of application 306 over the application development lifecycle. Comparisons of the versions can detect if any existing monitoring instructions are no longer applicable, based on recent application changes. Monitor application descriptors 314 provides the basis of a more complete solution for authoring application monitoring solutions. For example, the monitoring instructions are based on the application aspects exposed via monitor application descriptors 314, and kept up-to-date by detecting and responding to monitor application descriptors 314 change notifications.

Monitor model specifications are typically provided in the form of configuration information necessary for a monitor instance to monitor an application. For example, a monitor instance may specify the types of event information or variables to record, the frequency of such recordings, and the placement of the recorded information such as a log file. The specification may be in the form of a configuration file, control file, or other form suitable for a specific monitor and provided in monitor toolkit 316.

Illustrative embodiments typically expose the monitoring characteristics of each application component using monitor application descriptors 314 representation. The embodiments provide a mechanism for generating the monitor-specific instructions indirectly from a business integration module, without exposing the implementation details or internal representation of the business integration module and the module components. As a result, the target monitor is not required to understand the details of each business integration component to generate the appropriate monitoring instructions to monitor the component. The technique typically improves the simplicity of implementation and ease of maintenance.

Monitor toolkit 316 provides processes, adapters or plug-ins to create monitor-specific models, such as monitor model X 318. Monitor model X 318 is a monitor-specific instance used in an environment of a particular monitor server process and application combination. Monitor model X 318 is the output generated by monitor model generator 317, or processes, adapters or plug-ins of monitor toolkit 316 from monitor application descriptors 314. A monitor model is generated from the monitor application descriptions for a specific target monitor server process and application. The monitor model provides the target monitor specifications while the monitor application descriptions provide the application element specifications. A monitor model is a template used to create a model for a specific monitor server process.

Monitor model X 318 is the monitor-specific output of the monitor model generation process. Monitor model X 318 is deployed to monitor server process 330 to provide the monitoring capability as monitor application X 332.

Monitor server process 330 is an environment in which monitor application X 332 may run. Monitor server process 330 is a combination of hardware and software that receives events 328 from component runtime 322. Component runtime 322 emits events from components such as runtime for component A 324 and runtime for component B 326. Runtime component A 324 and runtime component B 326 correspond to application 306 components of component A 324 and component B 326.

User interface 334 is a graphical user interface providing access to the functions of system 300. User interface 334 is shown as providing access and control capability to both build 302 and runtime 320, as one example. In another example, separate user interfaces may be provided for each of the functional elements in both build 302 and runtime 320. A user communicates with the functions of build 302 to control what is processed to create a monitor-specific model as in monitor model X 318. A user interface such as user interface 334 is used to control monitor server process 330 using monitor model X 318 to monitor application X 332.

Figure 4:
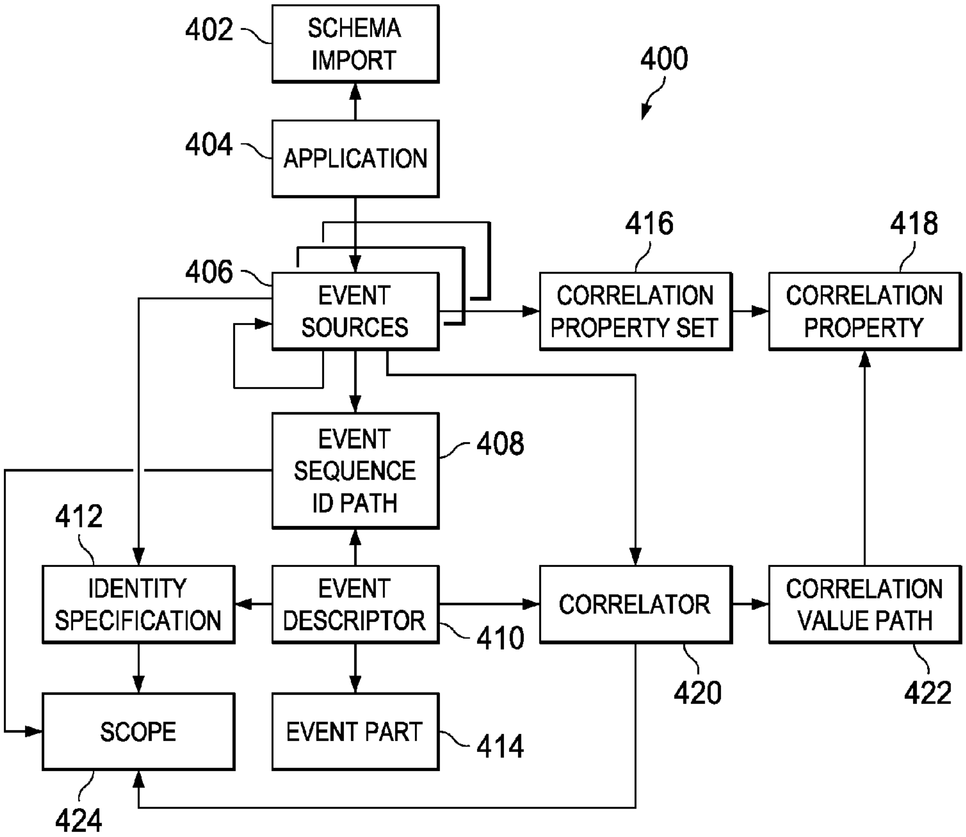
FIG. 4 is a block diagram of the structure of the generic model for event monitoring integration of FIG. 3, in accordance with illustrative embodiments.

With respect to FIG. 4, a block diagram of the structure of the generic model for event monitoring integration of FIG. 3, in accordance with illustrative embodiments, is shown. Components 400, as shown in FIG. 4, are examples of functional elements incorporated in the generic data model for event monitoring integration of build 302 of system 300 of FIG. 3. Monitor application descriptor generator 312 of FIG. 3 decomposes application 404, the application of interest, using information contained in schema import 402, into a set of elements. The set of elements are described in relation to component-specific event sources, such as event source 406 and event descriptors 410.

Correlation of various events is managed through maintaining event relationships using correlator 420 using correlation information found at correlation value path 422. The relationships are derived from event source 406 to create correlation property set 416 comprising a set of correlation property 418 entries for each event. Further correlator 420. uses correlation information that describes how the various events that are emitted by an application are related to each other, and to the event sources that emits the events, to maintain the defined relationships.

Events identified in event sources 406 to be monitored are assigned identifiers in identity specification 412 associated with each event part 414 described by event descriptor 410. Identity specification 412 contains descriptors for pieces of information within an event that identify which event source emitted the specific event. For example, identity specifications contain information that differentiates the events of one event source from the events of another event source. For example, event sources related to testing typically include, test started, test passed, test failed, test skipped, and test stopped. The specification typically differentiates the events by name and identifier. Event information related to proper sequencing of events is maintained as event sequence ID path 408.

Event sources 406 are the structural aspects of application 404 that may or may not be capable of emitting events at runtime. Event descriptors 410 describe the events that an event source of event sources 406 can emit. Each event descriptor 410 is associated with identity specifications 412 that describe how to relate an event to a particular event source when it is received at runtime.

Correlation information is also included in the monitor application descriptors 314 of FIG. 3 that describes how the various events that are emitted by application 404 are related to each other and to event sources 406 that emits the event.

Scope 424 tracks the relative dependency of elements in the model. Dependency is indicated as self, self and descendent or descendant within a presumed hierarchy of elements and events. Scope 424 is defined inside event sequence path 408, identity specification 412 and correlator 420. Scope 424 has values of "self", "self and descendent," or "descendant," which describe the applicability relationship or scope of the particular element.

Monitor application descriptors 314 of the model describe elements that can be monitored in application 404 without specifying how that information is used during monitoring. Monitor application descriptors 314 provides a generic data model that keeps the monitoring characteristics of an application separate from the application implementation information. Monitor application descriptors 314 forms the basis for integration between application 404 and instructions that describe how application 404 can be monitored, thus facilitating the integration across different products and enhancing usability of the descriptive information. Monitor application descriptors 314 defines what may be monitored without specifying how the monitoring is to occur. How monitoring occurs is typically monitor-specific.

Figure 5:
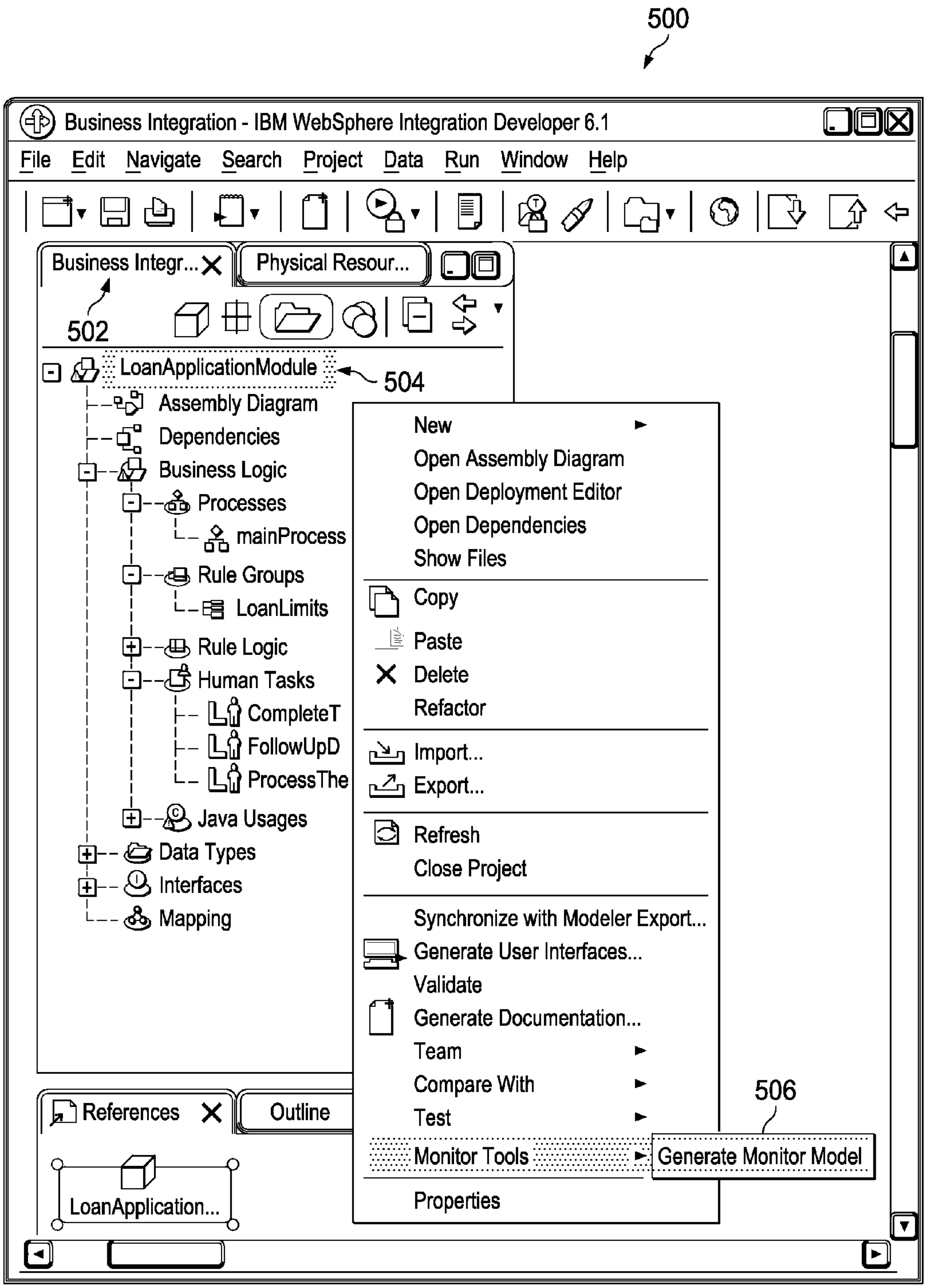
FIG. 5 is a pictorial representation of a user interface portion for creating a generic data model from an application of FIG. 3, in accordance with illustrative embodiments.

With reference to FIG. 5, a pictorial representation of a user interface portion for creating a generic data model from an application of FIG. 3, in accordance with illustrative embodiments, is presented. User interface portion 500 is an example of user interface 334 providing a graphic interface to build 302 of FIG. 3. User interface portion 500 depicts a screen capture illustrating selection of an action to commence the creation of the generic data model, as in build 302 of system 300 of FIG. 3. Business integration module 502 has been selected, from a set of business integration module candidates, as a component to be monitored as has a specific module within business integration module 502. The set of business integration modules comprises one or more modules that may comprise an application, such as application 404 of components 400 of FIG. 4.

For example, loan application module 504 part of a larger financial application containing other business integration modules, is selected specifically for monitoring. A user further selects "monitor tools" to choose the menu option of generate monitor model 506. The selection of generate monitor model 506 triggers a tool such as tool 304 to generate a monitor model such as monitor model X 318 of FIG. 3.

Figure 6:
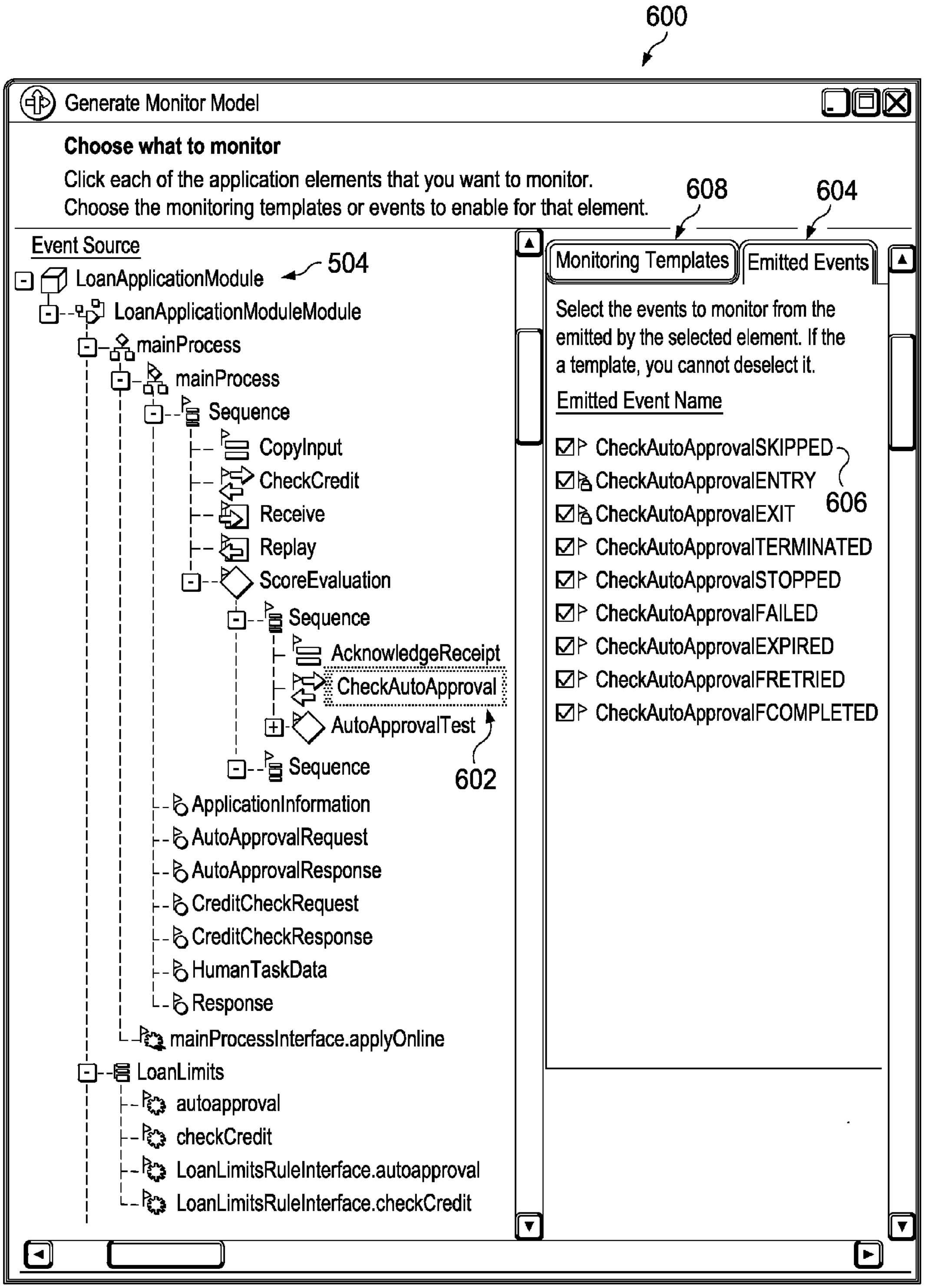
FIG. 6 is a pictorial representation of a user interface portion for selecting elements to monitor from an application of FIG. 5, in accordance with illustrative embodiments.

With reference to FIG. 6, a pictorial representation of a user interface portion for selecting elements to monitor from an application of FIG. 5, in accordance with illustrative embodiments is presented. User interface portion 600 is an example of user interface 334 in relation to build 302 of FIG. 3. User interface portion 600 depicts selection of application elements, such as elements from business integration module 502 of FIG. 5. The event source of loan application module 504 from business integration module 502 of FIG. 5 is depicted as open, presenting various elements for selection. Check auto approval 602 is highlighted as a selected element. Monitoring templates and emitted events are presented for the selected source entry of check auto approval 602.

Monitoring templates 608, shown as a tab, provides a list of templates that may be used with the selected element. Emitted events 604 is a list of available events based on the selected element of check auto approval 602. A user may then select which of the presented events is to be monitored, such as event 606. Choices made though this process determine what will be generated as output for the monitor-specific format.

With reference to FIG. 7, a text representation of a code snippet of a generic data model from an application to be monitored, in accordance with illustrative embodiments, is presented. Code snippet 700 depicts a portion of generic monitor application descriptor information extracted for a sample application representative of monitor application descriptors 314 of FIG. 3. The sample application may be similar to the previous business integration module 502 of FIG. 5 but in this example the application deals with expense reimbursement and approval.

The displayed name for the application, such as application 404 of FIG. 4, is found in statement 702. Statement 704 indicates the event sequence identifier path name describing the sequence of events and statement 706 provides the path identifier, such as event sequence ID path 408 of FIG. 4.

Correlation information is provided in statement 708. A named correlation property set having an associated property name is provided. An example of an associated property name is found in correlation property set 416 and correlation property 418 of FIG. 4. Statement 710 provides the name of the correlator, as in correlator 420 of FIG. 4, used to associate the described events.

Statement 712 provides an event descriptor name, as in event descriptor 410, while statement 714 indicates the name of the identity specification associated with the event descriptor of statement 712. Identity specification 412 of FIG. 4 is an example of an identify specification. Statement 716 provides path information for the event. Statement 718 provides an event part name, as in event part 414 of FIG. 4. Statement 720 provides a path for the named event part information.

Statement 722 provides a name for the next event descriptor, "ExpenseApproved," while statement 724 provides similar entries for an event descriptor of "ExpenseReimbursed."

Code snippet 700 provides a portion of descriptive information for a sample application, with reference to functional components of FIG. 4. The snippet presented uses convention extensible markup language notation, but other formats suitable for programmatic use may be implemented as well. FIG. 7 illustrates the type of information that is collected to provide a generic description of data typically needed for monitoring of an application.

With reference to FIG. 8, a text representation of a code snippet for event information emitted from a monitored application, in accordance with illustrative embodiments, is presented. Code snippet 800 represents an application-specific form of event information that may be emitted during the execution of the sample application identified in statement 702 of FIG. 7.

Statements 802, 804 and 806 represent emitted output of the three events 712, 722 and 724 respectively, described in FIG. 7. In particular, statements 802 is a set of statements corresponding to the collection of an event type of "SubmittedExpense" as in statement 712 of FIG. 7. Each event has a defined type, identifier and a sequence number. For example, in statements 802, the identifier is "ABC123" and the sequence number is "1." Further, in statements 802 is found details for each of the multiple expense items 1 and 2.

In a similar manner, statements 804 provides information for an expense type of "ExpenseApproved" with a sequence number "2." Set of statements 804 has only one set of details, compared to statements 802 in which there are two sets of detail statements. Statements 804 represents the emitted event information specified in the collection of statements associated with statement 722.

Statements 806 also have defined type, identifier, and sequence information but do not present a set of details statements. The detail is provided by the reimbursement entry. Statements 806 represents the emitted event information specified in the collection of statements associated with statement 724.

Figure 9:
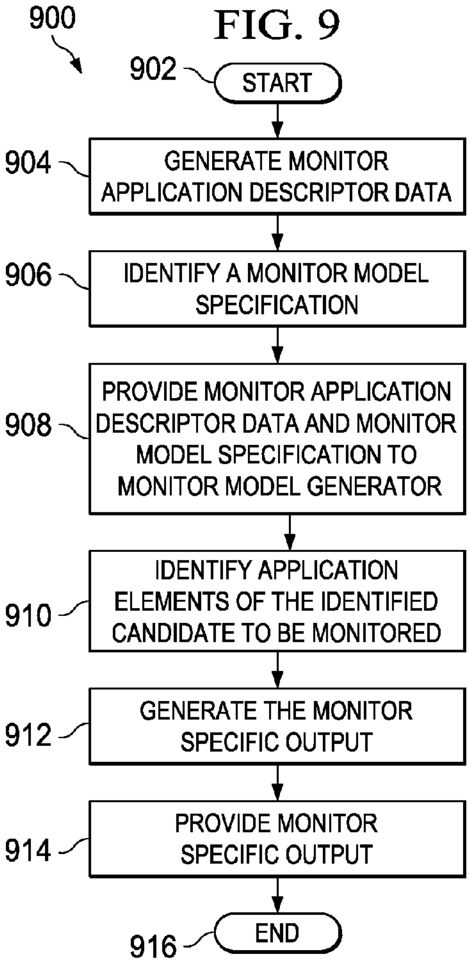
FIG. 9 is a flow diagram of a process of generating monitor-specific output from a generic data model, in accordance with illustrative embodiments.

With reference to FIG. 9, a flow diagram of a process of generating monitor-specific output from a generic data model, in accordance with illustrative embodiments, is presented. Process 900 is an example of a process of creating a generic data model for event monitoring of an application, using a software component, such as tool 304, as previously shown in build 302 of system 300 of FIG. 3. Process 900 is one example of a series of steps that may be used to create monitor-specific output using a generic data model.

Process 900 starts (step 902) and generates monitor application descriptor data (step 904). An application source is analyzed to produce a set of monitor application descriptors forming a monitor-neutral collection of information. The collection of information contains structural aspects of the application that may or may not be capable of emitting event information. During the generation process, the application is decomposed into event sources and associated event descriptors. The application source may also be referred to as a business integration module.

Identify a monitor model specification is performed to specify a target monitor model specification (step 906). The target monitor model specification provides a template of the monitor specific specifications. The specification is used to generate monitor-specific output in the form of a target monitor model X. Provide monitor application descriptor data and the identified target monitor model specification to the monitor model generator is performed to provide the necessary input for generation (step 908). The monitor application data describes the application elements in a monitor neutral format, whereas the target monitor model specification provides the specifications of the monitor model to be used. From the monitor application descriptor data, identify application elements of the identified candidate to be monitored (step 910). Desired elements of the identified candidate are selected for processing by the monitor model generator based on data gathering requirements and the ability of the application elements to provide events that emit information suitable for monitoring.

Generate the monitor-specific output combines the identified target monitor model specification with the monitor application descriptor data and application element information (step 912). Monitor-specific output is created from the generic monitor application descriptor data gathered previously in step 908. Provide the monitor-specific output to a requester makes the output ready for deployment (step 914). The monitor-specific output is made available, for example, for use in a monitor server process environment providing a capability to monitor the desired application components during execution. Process 900 terminates thereafter (step 916).

Figure 10:
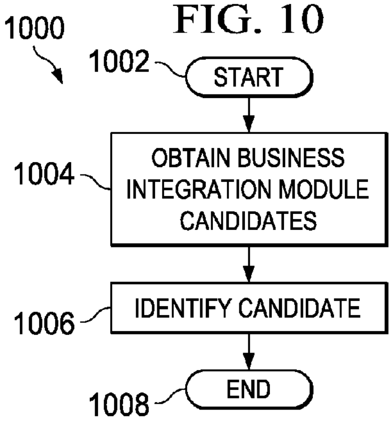
FIG. 10 is a flow diagram of a setup process used to prepare for generation of monitor application descriptors, as in the process of FIG. 9, in accordance with illustrative embodiments.

With reference to FIG. 10, a flow diagram of a setup process used to prepare for generation of monitor application descriptors, as in the process of FIG. 9, in accordance with illustrative embodiments is presented. Process 1000 is an example of a software component, such as tool 304 of system 300 of FIG. 3, used in preparation of the generation of application data descriptors.

Process 1000 starts (step 1002) and obtains business integration module candidates to form a set of candidates (step 1004). The business integration modules which form the set of candidates are application modules to be monitored. For example, business integration modules 502 from which loan application module 504 of FIG. 5 is selected. The application modules may have events capable of emitting event information. A set containing one or more business integration modules may typically be presented, for selection by a user, in a portion of a user interface.

The process identifies a candidate (step 1006). In these examples, the candidate is a candidate business integration module. The identified business integration module may be from the set of business integration modules presented in step 1004. For example, a set of applications may form a business integration module and only one particular application within the set of applications requires monitoring. The required application becomes the identified candidate. Process 1000 terminates thereafter (step 1008). The result of process 1000 forms the input to step 904 of process 900 of FIG. 9.

Figure 11:
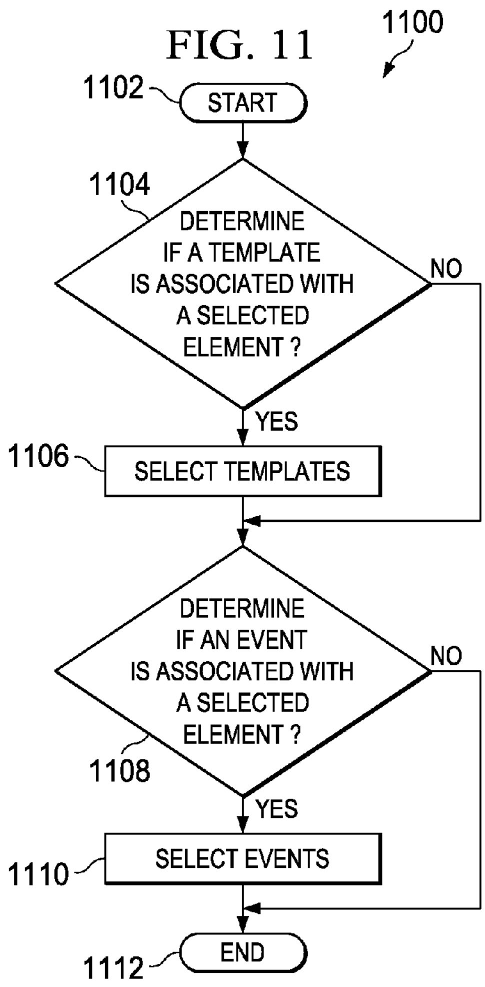
FIG. 11 is a flow diagram of a process for selecting element information needed for generating monitor-specific output, as in the process of FIG. 9, in accordance with illustrative embodiments.

With reference to FIG. 11, a flow diagram of a process for selecting element information needed for generating monitor-specific output, as in the process of FIG. 9, in accordance with illustrative embodiments is presented. Process 1100 is an example of a software component, such as tool 304 and user interface 334 of system 300 of FIG. 3, used to specify templates and events associated with an application candidate for monitoring.

Process 1100 starts (step 1102) and determines if a template is associated with a selected element (step 1104). If a determination is made that there are templates associated with a selected element, a "yes" is obtained. If a determination is made that there are no templates associated with a selected element, a "no" is obtained. When a "no" is obtained in step 1104, process 900 advances to step 1108. No templates indicate a condition in which there is no selection possible because either there are no templates for the selected element or the templates are predefined.

When a "yes" is obtained in step 1104, and based on the selection of elements, choices for supported templates associated with the elements are presented for selection. For example, checkautoapproval 602 provides a set of choices of monitoring templates 608 of FIG. 3. Select templates is performed to choose the desired monitoring templates from the set of monitoring templates associated with the element that are presented (step 1106).

A determination is made as to whether an event is associated with a selected element is performed by the process (step 1108). If a determination is made that there are events associated with a selected element, a "yes" is obtained. If a determination is made that there are no events associated with a selected element, a "no" is obtained. When a "no" is obtained in step 1108, process 1100 terminates (step 1112). When there are no associated events, a selection is not possible because either there are no events for the selected element or the associated events are predefined. When a "yes" is obtained in step 1108, and based on the selection of elements, choices for supported events are presented for selection. For example, emitted events 604 of FIG. 6 depict a set of possible emitted events to monitor. Select events is performed (step 1110). Events are thus selected from the set of events presented. Process 1100 terminates thereafter (step 1112).

Thus, illustrative embodiments have been described that provide a capability to obtain application source as input, and analyze the application source to define application elements for monitoring. The analysis provides input to a monitor application descriptor generator that creates a monitor-neutral output consisting of monitoring characteristics of the application in the form of monitor application descriptors. The monitoring characteristics are separate from the application implementation information. The monitor application descriptors allow integration between an application and instructions that describe how to monitor the application. The definitions of the monitor application descriptors provide a capability to support different monitor environments with a single source of descriptor data.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for a generic data model for event monitoring integration, the computer-implemented method comprising:

generating, by a computer, monitor application descriptor data for an identified candidate by decomposing the identified candidate into a set of elements that include event sources and associated event descriptors that describe the events that an event source of event sources can emit using a monitor application descriptor generator, wherein the identified candidate is an application;

identifying, by the computer, a monitor model associated with the identified candidate to form an identified target monitor model specification template;

responsive to identifying the target monitor model specification template, the computer providing the monitor application descriptor data and the target monitor model specification template to a monitor model generator;

identifying application elements, derived from the monitor application descriptor data and generated by the computer in the monitor application descriptor generator using source statements of the application, of the identified candidate to be monitored to form identified elements, wherein the identified elements are selected by a user from a user interface, configured to browse a module of the application, by first selecting an event source for the application and then selecting one or more emitted events associated with the event source;

determining, by the computer, if the target monitor model specification template is associated with at least one identified element;

responsive to a determination that the target monitor model specification template is associated with the at least one identified element, the computer selecting the target monitor model specification template;

determining, by the computer, if an event is associated with the at least one identified element;

responsive to a determination that the event is associated with the at least one identified element, the computer presenting a choice for the at least one identified event for selecting by a user; and generating, by the computer, the identified monitor model for the elements identified and chosen to create the identified monitor model output for monitoring the identified candidate by the monitor model generator using the target monitor model specification template.

2. The computer-implemented method of claim 1, further comprising:

obtaining business integration modules, to form a set of candidates, wherein the business integration modules are application components;

identifying a candidate from the set of candidates to form the identified candidate; and providing the monitor-specific output to a user;

wherein the one or more emitted events associated with the event source are selected from a list consisting of an ENTRY event, an EXIT event, a SKIPPED event, a TERMINATED event, a STOPPED event, a FAILED event, an EXPIRED event, a RETRIED event, and a COMPLETED event.

3. The computer-implemented method of claim 1, wherein monitor application descriptor data is monitor-neutral, separating monitoring characteristics of an application from application implementation information.

4. The computer-implemented method of claim 1, wherein the monitor application descriptor data is a representation of an application structure comprising event sources and event descriptors.

5. The computer-implemented method of claim 4, wherein the event descriptors describe events emitted by event sources.

6. The computer-implemented method of claim 1, wherein responsive to identifying the target monitor model specification template further comprises:

selecting a target monitor model specification for the monitor model associated with the identified candidate from a set of monitor models supported by a monitor toolkit for a target monitor server process.

7. A data processing system for a generic data model for event monitoring integration, the data processing system comprising:

a bus;

a memory connected to the bus, wherein the memory comprising computer-executable instructions;

a communications unit connected to the bus;

a processor unit connected to the bus, wherein the processor unit executes the computer-executable instructions to direct the data processing system to:

generate monitor application descriptor data for an identified candidate by decomposing the identified candidate into a set of elements that include event sources and associated event descriptors that describe the events that an event source of event sources can emit using a monitor application descriptor generator, wherein the identified candidate is an application;

identify a monitor model associated with the identified candidate to form an identified target monitor model specification template;

responsive to identifying the monitor model, providing the monitor application descriptor data and the identified target monitor model specification template to a monitor model generator;

identify application elements, derived from the monitor application descriptor data generated by the monitor application descriptor generator using source statements of the application, of the identified candidate to be monitored to form identified elements, wherein the identified elements are selected by a user from a user interface, configured to browse a module of the application, by first selecting an event source for the application and then selecting one or more emitted events associated with the event source;

determine if the target monitor model specification template is associated with at least one identified element;

responsive to a determination that the target monitor model specification template is associated with the at least one identified element, selecting the target monitor model specification template;

determine if an event is associated with the at least one identified element; and responsive to a determination that the event is associated with the at least one identified element, presenting a choice for the at least one identified event for selecting by a user; and generate the identified monitor model for the elements identified and chosen to create an identified monitor model output for monitoring the identified candidate for the events selected by the monitor model generator using the target monitor model specification template.

8. The data processing system of claim 7, wherein the processor unit executes the computer-executable instructions further to direct the data processing system to:

obtain business integration modules, to form a set of candidates, wherein the business integration modules are application components;

identify a candidate from the set of candidates to form the identified candidate; and provide the monitor-specific output to a user, wherein the one or more emitted events associated with the event source are selected from a list consisting of an ENTRY event, an EXIT event, a SKIPPED event, a TERMINATED event, a STOPPED event, a FAILED event, an EXPIRED event, a RETRIED event, and a COMPLETED event.

9. The data processing system of claim 7, wherein the monitor application descriptor data is monitor-neutral, separating monitoring characteristics of an application from application implementation information.

10. The data processing system of claim 7, wherein the monitor application descriptor data is a representation of an application structure comprising event sources and event descriptors.

11. The data processing system of claim 10, wherein the event descriptors describe events emitted by the event sources.

12. The data processing system of claim 7, wherein the processor unit executes the computer-executable instructions to direct the data processing system to be responsive to identifying a monitor model further comprises:

selecting a target monitor model specification for the monitor model associated with the identified candidate from a set of monitor models supported by a monitor toolkit for a target monitor server process.

13. A computer program product for a generic data model for event monitoring integration, the computer program product comprising:

a computer-recordable storage medium containing computer-executable instructions stored therein, the computer-executable instructions comprising;

computer-executable instructions for generating monitor application descriptor data for an identified candidate by decomposing the identified candidate into a set of elements that include event sources and associated event descriptors that describe the events that an event source of event sources can emit using a monitor application descriptor generator, wherein the identified candidate is an application;

computer-executable instructions for identifying a monitor model associated with the identified candidate to form an identified target monitor model specification template;

computer-executable instructions responsive to identifying the identified target monitor model specification template, for providing the monitor application descriptor data and the identified target monitor model specification template to a monitor model generator;

computer-executable instructions for identifying application elements, derived from the monitor application descriptor data generated in the monitor application descriptor generator using source statements of the application, of the identified candidate to be monitored to form identified elements, wherein the identified elements are selected by a user from a user interface, configured to browse a module of the application, by first selecting an event source for the application and then selecting one or more emitted events associated with the event source;

determine if the target monitor model specification template is associated with at least one identified element;

computer-executable instructions responsive to a determination that the target model specification template is associated with the at least one identified element, for selecting the target model specification template by the computer;

computer-executable instructions for determining if an event is associated with the at least one identified element;

computer-executable instructions responsive to a determination that the event is associated with the at least one identified element, presenting a choice for the at least one identified event for selecting by a user; and computer-executable instructions for generating the monitor model for the elements identified and chosen to create an identified monitor model output for monitoring the identified candidate by the monitor model generator using the target model specification template.

14. The computer program product of claim 13, further comprising:

computer-executable instructions for obtaining business integration modules, to form a set of candidates, wherein the business integration modules are application components;

computer-executable instructions for identifying a candidate from the set of candidates to form the identified candidate; and computer-executable instructions for providing the monitor-specific output to a user, wherein the one or more emitted events associated with the event source are selected from a list consisting of an ENTRY event, an EXIT event, a SKIPPED event, a TERMINATED event, a STOPPED event, a FAILED event, an EXPIRED event, a RETRIED event, and a COMPLETED event.

15. The computer program product of claim 13, wherein monitor application descriptor data is monitor-neutral, separating monitoring characteristics of an application from application implementation information.

16. The computer program product of claim 13, wherein the monitor application descriptor data is a representation of an application structure comprising event sources and event descriptors, wherein the event descriptors describe events emitted by event sources.

17. The computer program product of claim 13, wherein computer-executable instructions responsive to identifying a monitor model further comprise:

computer-executable instructions for selecting a target monitor model specification for the monitor model associated with the identified candidate from a set of monitor models supported by a monitor toolkit for a target monitor server process.

* * * * *